UNITED STATES PATENT OFFICE.

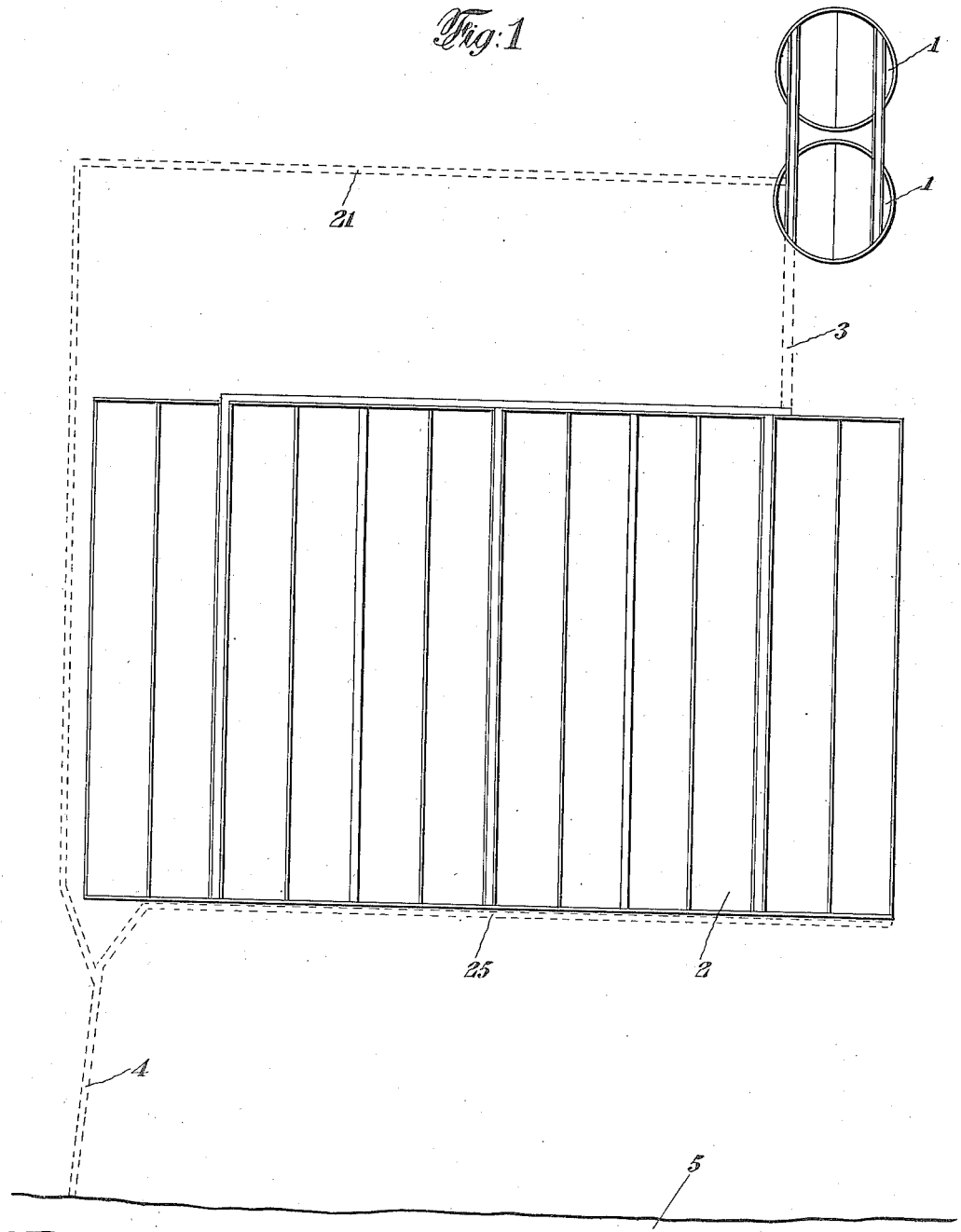

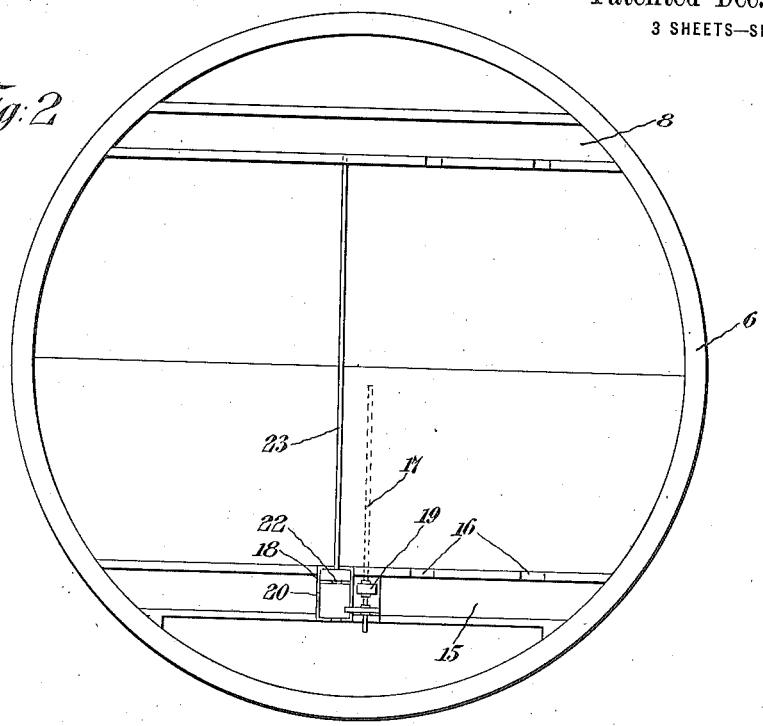
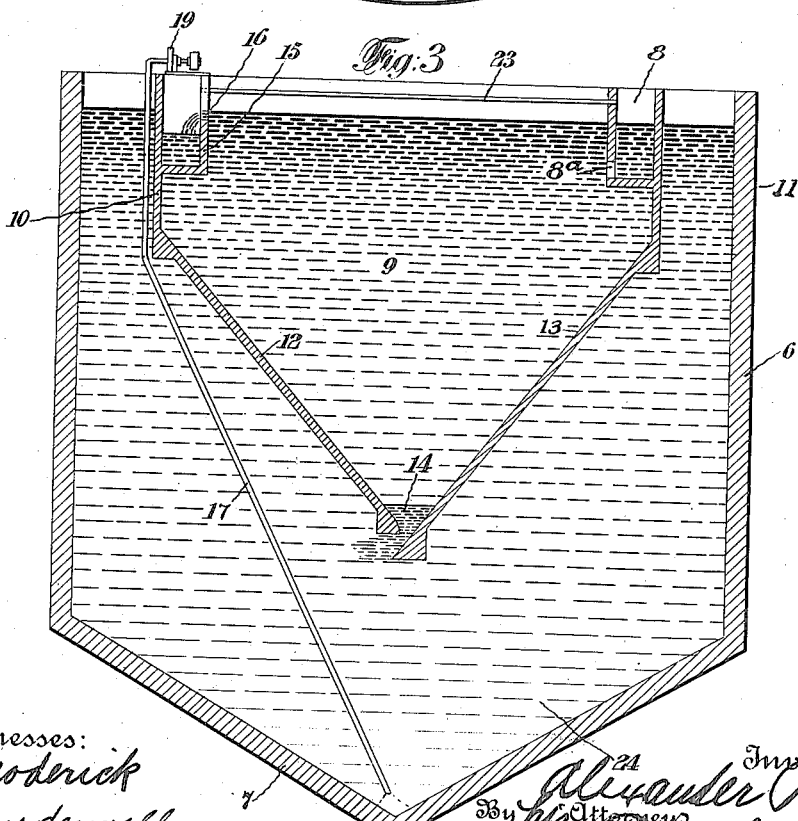

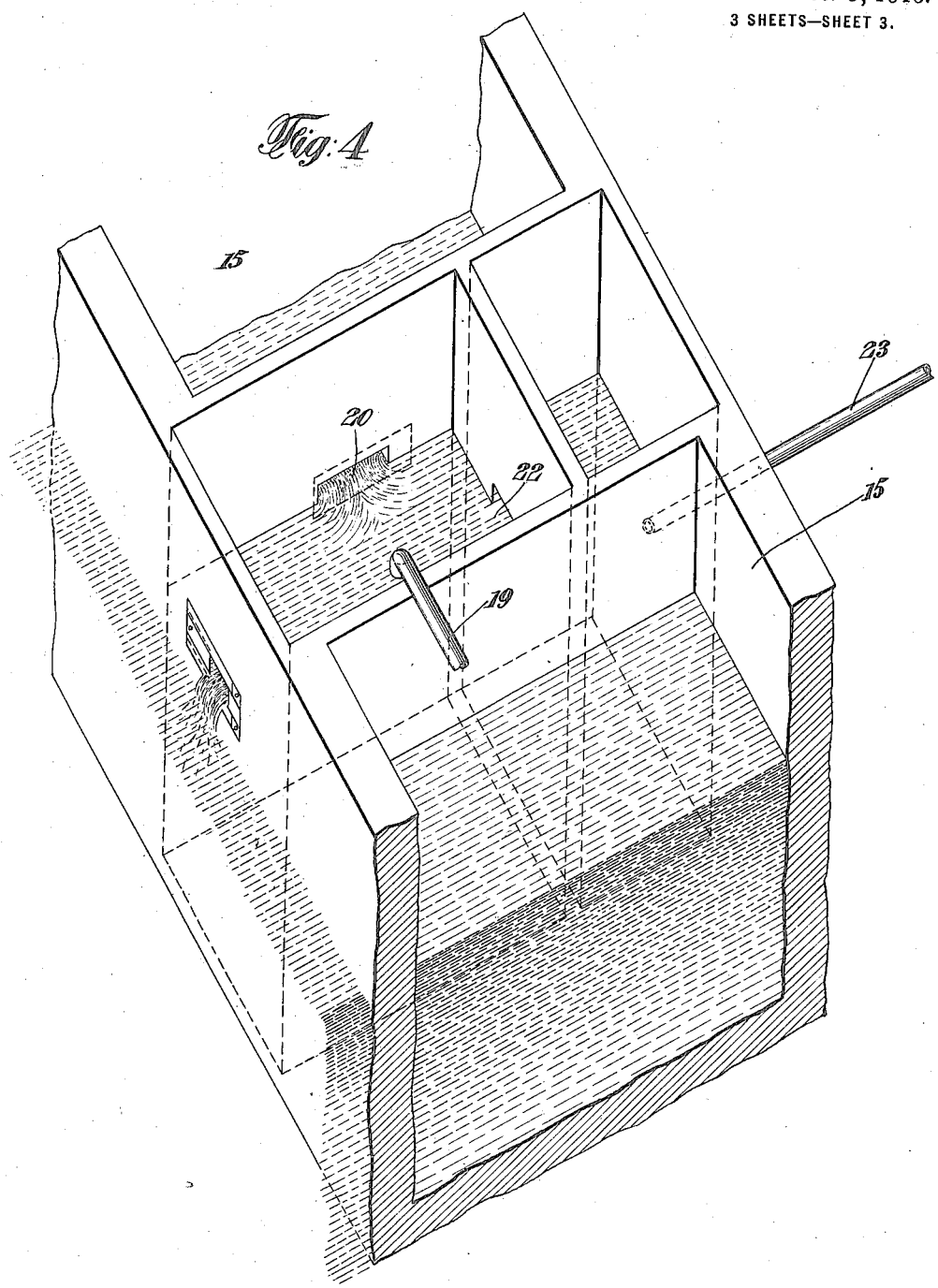

ALEXANDER POTTER, OF NEW YORK, N. Y.

PROCESS OF DISPOSING OF SEWAGE.

1,207,621.

Specification of Letters Patent.

Patented Dec. 5, 1916.

Application filed October 18, 1913. Serial No. 795,844.

*To all whom it may concern:*

Be it known that I, ALEXANDER POTTER, of New York, in the county of New York, and in the State of New York, have invented a certain new and useful Improvement in Processes of Disposing of Sewage, and do hereby declare that the following is a full, clear, and exact description thereof.

The object of my invention has been to provide an improved process of disposing of sewage which shall be capable of practice in a plant that is comparatively simple and cheap in construction and operation, and shall cause such disposition to take place with greater certainty and speed than heretofore, and which shall make possible the avoidance of the use of sludge beds; and to such ends my invention consists in the process of disposing of sewage hereinafter specified.

In the accompanying drawings Figure 1 is a plan view of a plant suitable for the practice of my invention and adapted for practice according to my process; and Figs. 2 and 3 are, respectively, a plan view and a vertical sectional elevation of a settling tank forming a part of the said plant and Fig. 4 is a perspective view of the weir box and adjacent parts.

In the accompanying drawings I have illustrated the best embodiment of my invention known to me, but such embodiment is to be regarded as typical only of many possible embodiments and my invention is not to be limited thereto.

My invention relates to the general type of sewage disposal plants in which the solid matter is separated from the water of the sewage and the water filtered and rendered unobjectionable, the solid matter being held until it has reached an unputrescible condition and then being disposed of.

In the illustrated embodiment, the plant consists of settling tanks 1 into which the sewage is first led. The settling tank will later be described in detail. The water passes from the settling tanks to filter beds 2, from the filter through a pipe or conduit 3. From the filter beds the filtered water passes as by a pipe or conduit 4 to a ditch or stream 5, and alternately to a river or other place of final disposal.

Referring now particularly to the settling tanks, the said tanks, as illustrated, consist of a wall, preferably cylindrical, 6 having a pyramidal or conical bottom 7, which parts may be constructed of concrete. The sewage enters the tank by a distributing trough 8 having openings 8ª by which it enters an upper or settling chamber 9, the latter consisting preferably of vertical walls 10 and 11 having inclined walls 12 and 13, respectively, extending downward and inward from the lower edges of said vertical walls, the said walls 12 and 13 forming between them a slot or opening 14. On the wall 10 is preferably formed an effluent trough 15 having a weir 16 by which the surface water may enter the said trough flowing across the tank from the trough 8.

A pipe 17 has its lower end near the lower point of the pyramidal or conical bottom or sump, the upper end of the pipe in the present instance discharging into a weir chamber 18, and when said chamber is higher than the surface of the water in the settling chamber, a pump 19 or mechanical water elevating device may be provided to assist in raising the sludge through the pipe 17. One slot 20 of the weir chamber 18 is so arranged to permit a fixed amount of the digested sludge to pass off into the effluent channel if the sludge is to pass to the filters, or to a by-pass 21 if the sludge is to flow away without passing through the filters, as hereinafter described. The excess sludge water, which is not to pass over the slot 20, escapes by a slot 22 and, as I prefer, passes by pipe 23 to the influent trough 8.

In the operation of my said plant according to my said process, the sewage enters the influent trough 8 and passes by the openings 8ª into the upper or settling compartment, and there is a very slow movement across the upper part of this compartment to the effluent trough 15 so that time is afforded for the sludge and heavier matters to settle in the said compartment and pass through the slot 14 into the sludge digestion chamber 24 below. In the sludge digestion chamber the sludge gradually undergoes decomposition, the decomposed matter settling to the bottom and being unputrescible and unobjectionable and comparatively free from odor. The pipe 17 extends down into the region occupied by this unputrescible mass and such material passes upward through the said pipe (which pipe is made large enough to prevent its silting up) and passes into the weir box 18. An amount of it is allowed to escape over the slot 20, which is about equal to the amount which is being formed in the bottom of the sludge digestion chamber at the same time. In order, however, to prevent clogging of the pipe 17 it is desirable that the movement in the said pipe shall not be too slow, and I therefore prefer to pump an amount of sludge through the said pipe greater than that which is being formed in a corresponding interval of time, and to return the excess to the said chamber so that the said pipe 17 shall never exhaust undigested sludge because the normal amount of such sludge shall be maintained by the return of the excess. While such excess could be returned directly, I prefer to return it by way of the pipe 23 and the influent trough 8 because they will cause a downward circulation through the upper or settling compartment, which has the advantage of causing the matter, which is of substantially the same specific gravity as the water, to pass downward through the slot 14. Such lighter matter would otherwise remain unprecipitated. Moreover, the mechanical action of the descending excess sludge in passing through the settling chamber tends to aid in the precipitation of such lighter matters.

I have found that a quantity of the digested sludge is so small, and its nature so unobjectionable that it is entirely permissible to cause it to pass to the filters with the water entering the effluent trough 15 over the weir 16, the water and sludge passing by the pipe 3 to the filters 2 and thence by the pipe 25 to the drainage ditch 5. If, however, it is desired, the fixed amount of digested sludge passing over the weir 20 may be conveyed by a by-pass 21 around the filters so as to go directly to the stream carrying away the filtered water. I have discovered that the character of the said sludge which settles in the bottom of the digestion chamber 24 is such that its direct discharge in this manner into a natural waterway will not be accompanied by any unsanitary or unsightly conditions, provided it is discharged, as I have provided, more or less continuously and in the approximate ratio of the volume of digested sludge contained in a given quantity of sewage flow. I have also discovered that the nature of the digested sludge is such that it can, if desired, be added to the settled sewage even before its discharge upon the coarse-grained filters without causing any appreciable clogging of the same or any substantial interference with the bacterial efficiency of the same. This discovery is particularly advantageous in the case of tidal waters or large rivers, as the necessary purification can be accomplished solely by settling and sterilization. The net effect on the silting up of the waterways by the digested sludge continuously discharged is inconsiderable, for a properly digested settling tank reduces the bulk of its sludge in the digested form to a small fraction of the original putrescible solid matter in the sewage, consequently the digested sludge is similar to the ordinary silt transported by a river.

My invention may do away entirely with the expensive and objectionable sludge beds upon which the digested sludge would, according to previous practice, be deposited.

I claim—

1. The process of sewage disposal consisting in separating the sludge from the water, retaining the sludge to bring about digestion substantially by natural action, and discharging digested sludge substantially uniformly and continuously.

2. The process of sewage disposal which consists in holding a body of sewage substantially quiet to facilitate settling of the sludge, digesting the sludge and raising the digested sludge, and permitting it to flow back through such body of sewage.

3. The process of sewage disposal consisting in holding a body of sewage substantially quiet, settling the sludge therefrom, digesting the sludge, raising digested sludge and causing a portion thereof to flow away and a portion thereof to pass downward again through said body of sewage.

4. The process of sewage disposal consisting in causing a body of sewage to move at a very low rate of flow, so as to facilitate settling the sewage therefrom, permitting the substantially clear water to flow away, digesting the settled sludge, raising such digested sludge and permitting a portion to flow away with the said water and a portion to return downward through the said sewage.

5. The process of sewage disposal which consists in holding a body of sewage substantially quiet to facilitate settling of the sludge, digesting the sludge, raising a portion of the digested sludge and permitting part to flow away and part to return to the mass of settled sludge.

6. The process of sewage disposal consisting in holding a body of sewage substantially quiet to facilitate settling the sludge, digesting the sludge, substantially continuously raising digested sludge and causing a portion thereof to flow away, and a portion thereof to flow back to the main body of sludge.

7. The process of sewage disposal consisting in holding a body of sewage substantially quiet, settling the sludge therefrom, digesting the sludge, raising digested sludge through a pipe substantially continuously and causing a portion thereof to flow away, and a portion thereof to pass downward again to the main body of sewage.

In testimony that I claim the foregoing I have hereunto set my hand.

ALEXANDER POTTER.

Witnesses:
J. FREUDENVOLL,
L. BRODERICK.